US 8,447,965 B2

(12) United States Patent
Minagawa et al.

(10) Patent No.: US 8,447,965 B2
(45) Date of Patent: May 21, 2013

(54) APPARATUS FOR MONITORING MICROPROCESSOR

(75) Inventors: Yoshihiko Minagawa, Minamikoma-gun (JP); Ichiro Yoda, Yamanashi-ken (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 473 days.

(21) Appl. No.: 12/702,795

(22) Filed: Feb. 9, 2010

(65) Prior Publication Data

US 2010/0205426 A1    Aug. 12, 2010

(30) Foreign Application Priority Data

Feb. 10, 2009    (JP) .................................. 2009-028261

(51) Int. Cl.
*G06F 9/00*    (2006.01)
(52) U.S. Cl.
USPC .................................................. 713/1; 713/2
(58) Field of Classification Search
USPC ........................................................ 713/1, 2
See application file for complete search history.

(56) References Cited

U.S. PATENT DOCUMENTS

| | | | | | |
|---|---|---|---|---|---|
| 5,467,286 | A | * | 11/1995 | Pyle et al. | 702/62 |
| 5,564,015 | A | * | 10/1996 | Bunnell | 714/47.2 |
| 5,594,865 | A | * | 1/1997 | Saitoh | 714/55 |
| 5,649,098 | A | * | 7/1997 | Shieh et al. | 714/55 |
| 5,864,663 | A | * | 1/1999 | Stolan | 714/55 |
| 5,923,838 | A | * | 7/1999 | Hongo | 714/42 |
| 5,983,330 | A | * | 11/1999 | Miwa et al. | 711/167 |
| 6,385,274 | B1 | * | 5/2002 | Nohara | 377/20 |
| 7,334,167 | B2 | * | 2/2008 | Stabrowski | 714/51 |
| 2006/0010351 | A1 | * | 1/2006 | Lee | 714/43 |

FOREIGN PATENT DOCUMENTS

JP        H10-269109        10/1998

* cited by examiner

*Primary Examiner* — Chun Cao
(74) *Attorney, Agent, or Firm* — Manabu Kanesaka (57) ABSTRACT

To provide a method for enabling a microprocessor to be restarted after rewriting a program without providing a dedicated circuit and an apparatus using the method, a timer for counting a predetermined clock is controlled in the following first and second modes, where in the first mode, the timer is reset (count-cleared) at predetermined intervals by a program so as to monitor an operating status of the program, and in the second mode, the microprocessor is restarted without resetting the timer at predetermined intervals by the program.

6 Claims, 8 Drawing Sheets

(a) FIRST MODE

MONITORED PROGRAM
(MAIN PROGRAM)

(b) SECOND MODE

OLD REWRITE PROGRAM ON RAM

APPARATUS FOR MONITORING MICROPROCESSOR

BACKGROUND OF THE INVENTION

1. Technical Field

The present invention relates to a microprocessor monitoring apparatus for monitoring an operating status of a CPU (Central Processing Unit), while performing reset operation on the CPU.

2. Description of the Related Art

In an apparatus with a microprocessor, a program may go out of control due to hardware failure, etc. and a hardware timer circuit called a watchdog timer is provided to detect such runaway of the program (for example, see Japanese Laid-Open Patent Publication No. H10-269109). A reset signal is input to the watchdog timer (hereinafter, abbreviated as WDT) from a monitored program at predetermined intervals, and when the reset signal is not input due to runaway of the monitored program, the WDT restarts the microprocessor.

Further, when a program (firmware) that the microprocessor executes is rewritten for the reason of updating the apparatus function, modifying a bug, or the like, in order to execute a new program, it is necessary to restart the microprocessor after the rewrite so as to execute the main program from the first line.

Conventionally, since a restart dedicated circuit is provided to restart, the circuit has become larger. Therefore, it is an object of the present invention to provide a method for enabling a microprocessor to be restarted after rewriting a program without providing a dedicated circuit and an apparatus using the method.

BRIEF SUMMARY OF THE INVENTION

To attain the above-mentioned object, in the invention, a timer means for counting a predetermined clock is controlled by following first mode and second mode. It is a feature that in the first mode the timer means is reset (count-cleared) at predetermined intervals by a program to monitor an operating status of the program, and that in the second mode the microprocessor is restarted without resetting the timer means at predetermined intervals by the program. The configuration will specifically be described. The apparatus has a microprocessor, storing means for storing a program that the microprocessor executes, timer means for timing, and control means for controlling the timer means. Then, the control means is provided with the first mode for resetting the timer means at predetermined intervals by the program and monitoring an operating status of the program, and the second mode for restarting the microprocessor without resetting the timer means at predetermined intervals by the program.

ADVANTAGEOUS EFFECT OF THE INVENTION

The invention enables a single timer means to monitor an operating status of a microprocessor and perform restarting operation, and thus, enables the circuit configuration to be reduced in size and simplified. In other words, the timer means that has conventionally been used only as a monitoring apparatus of the microprocessor is configured to restart the microprocessor, and the need is thereby eliminated to provide a restart dedicated circuit.

BRIEF DESCRIPTION OF THE SEVERAL VIEWS OF THE DRAWINGS

FIG. 5(a) shows a first mode (program monitoring mode), and FIG. 5(b) shows a second mode (program non-monitoring mode);

DETAILED DESCRIPTION OF THE INVENTION

Figure 1:
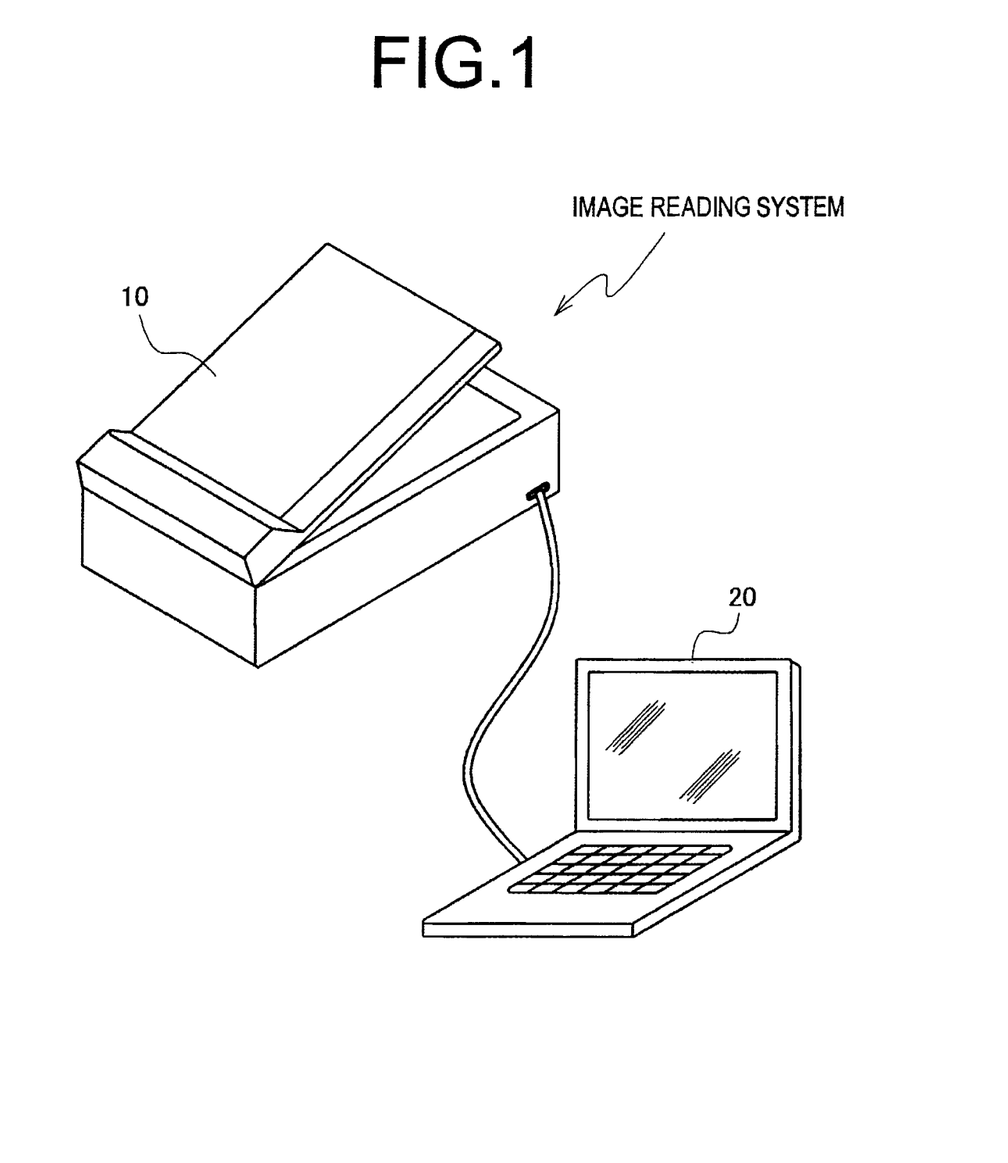
FIG. 1 is a configuration explanatory view of an image reading system according to the invention.

The present invention will be described using an image reading system as an example. As shown in FIG. 1, the image reading system has a scanner 10 that is an image reading apparatus for reading an image of an original document, and a personal computer (hereinafter, abbreviated as "PC") 20 that is an upper apparatus of the scanner 10 and that transmits various commands to the scanner. The PC 20 and scanner 10 are connected via an interface such as USB, SCSI, Ethernet and PCIe, and the PC has incorporated application program as a user interface for the scanner and driver program to operate the scanner.

Further, the PC 20 is connected to a network, and is configured to acquire a new program via the network in rewriting the program of the scanner 10 and transmit the new program to the scanner 10. In addition, the scanner 10 maybe a complex apparatus provided with various functions such as a printer and facsimile, and any apparatus is applicable which is provided with a watchdog timer circuit described later.

Further, this Embodiment describes the example of using the separate PC 20 as an upper apparatus of the scanner 10 i.e. an apparatus to issue commands to the scanner 10, but the scanner 10 maybe internally provided with a command transmitting section (application and driver) that has the same function as that of the PC 20 to exchange commands and image data inside the scanner. In this case, the scanner itself is provided with a display section such as a display, and is configured to enable a user to set various reading conditions on a setting screen in the display section.

[Configuration of the Scanner]

Figure 2:
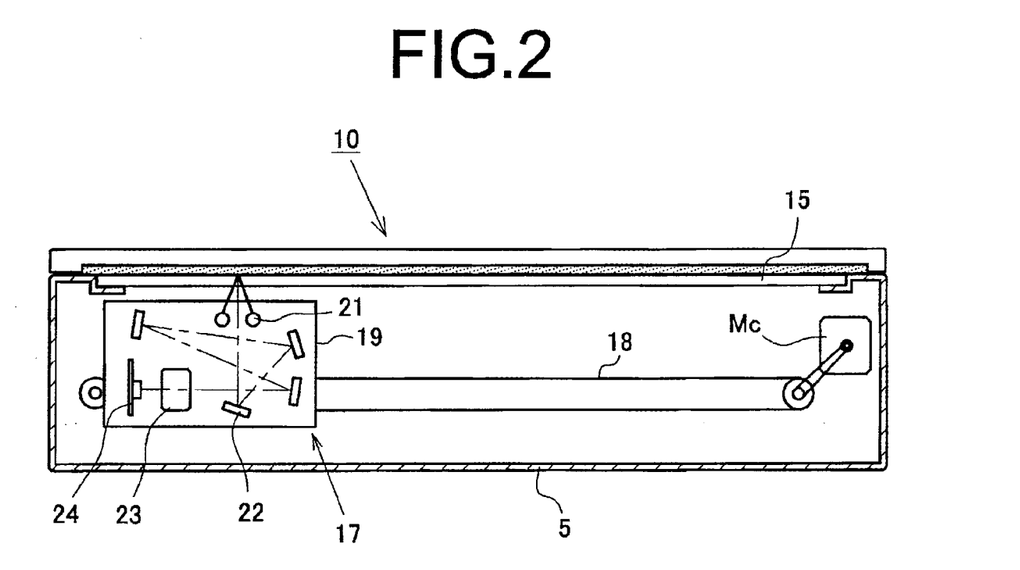
FIG. 2 is a configuration diagram of an image reading apparatus in the apparatus of FIG. 1.

As shown in FIG. 2, the scanner 10 has a platen 15 supported on the upper surface of a casing 5 to mount an original document, and an image reading unit 17 for reading the original document on the platen 15. In the image reading unit 17, in order to read an image of the original document on the platen while moving along the platen 15, a traveling belt 18 coupled to a motor Mc is coupled to a carriage 19. A light source 21 irradiates the original document on the platen 15 with light, the reflected light from the document is guided to a condenser lens 23 via a mirror 22, the condenser lens 23 forms an image on a reading sensor (CCD) 24 so as to perform photoelectric conversion, and reading of the document image is thereby performed.

Figure 3:
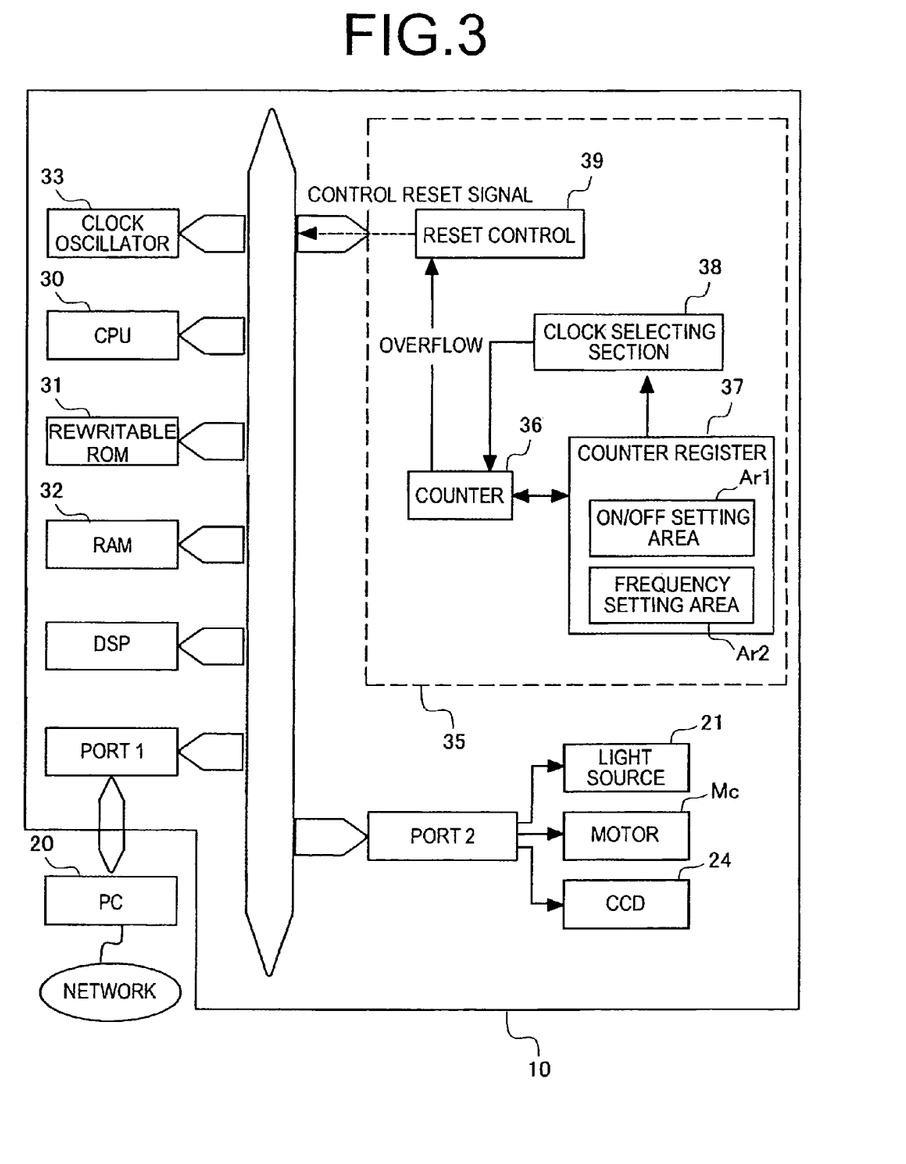
FIG. 3 is a hardware configuration block diagram in the apparatus of FIG. 1.

As shown in FIG. 3, the PC 20 and scanner 10 are connected via a port 1, and the PC 20 is connected to the network. The scanner 10 is provided with a CPU 30 that is a microprocessor to perform various computation processing, flash memory as a rewritable ROM 31 that is a storing means for storing programs that the CPU 30 executes, RAM 32 that is memory to temporarily store data, etc. during various processing, clock oscillator 33 that issues a clock, and watchdog timer circuit (hereinafter, referred to as a WDT circuit) 35 to perform monitoring of the program, and further, is connected to the light source 21, motor Mc and CCD 24 via a port 2.

Figure 4:
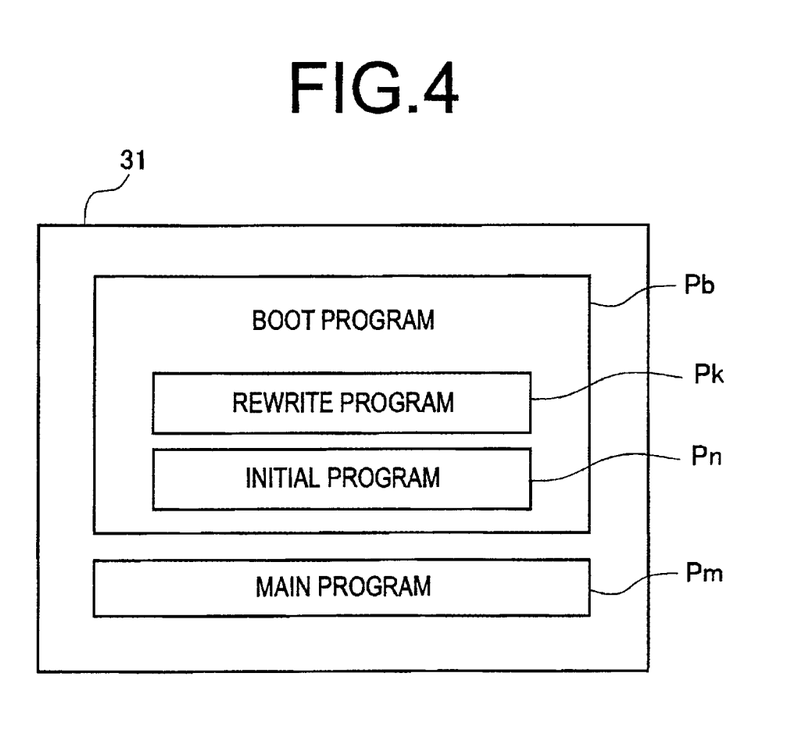
FIG. 4 is a configuration schematic view of a program in a rewritable ROM according to the invention.

As shown in FIG. 4, the rewritable ROM 31 stores a boot program Pb having an initial program Pn and rewrite program Pk, and main program Pm. The initial program Pn is a program to execute initial processing such as clearing the RAM 32 and initializing various kinds of hardware when the apparatus is turned on, and the boot program Pb is a program that is executed when the boot program itself or main program Pm is rewritten. The main program Pm is a program for the scanner 10 to execute various kinds of processing after the initial processing. In addition, for simplicity in description, FIG. 4 shows the rewrite program Pk and initial program Pn as separate programs, but the programs are configured as an integrated continuous program.

Meanwhile, the WDT circuit 35 is provided with a counter (CNT) 36 to count up, counter register 37 to perform various settings of the counter 36, clock selecting section 38 for inputting a clock with a predetermined frequency corresponding to the setting of the counter register 37 to the counter 36, and reset control 39 for generating a reset signal to reset the control system including the CPU 30 when the count number of the counter 36 reaches a beforehand defined predetermined value (the overflow occurs). The counter register 37 has an ON/OFF setting area (count operation is started in the case of "1", while being halted in the case of "0", and the count value is initialized to zero) Ar1 to select and set start/halt of the count operation of the counter 36, and a frequency setting area Ar2 to select and set the frequency of the clock to input to the counter 36, and the clock selecting section 38 selects and inputs the clock with a predetermined frequency according to the settings in the frequency setting area Ar2. The counter 36 causes an overflow after counting the beforehand defined predetermined number of clocks.

Accordingly, the time (overflow time T) elapsed before the overflow is variable according to the frequency of the clock output from the clock selecting section 38, and the overflow time T is shorter as the frequency is increased.

[Monitoring of the Program by the WDT Circuit]

Monitoring of the program by the WDT circuit 35 is performed as described below.

Figure 5:
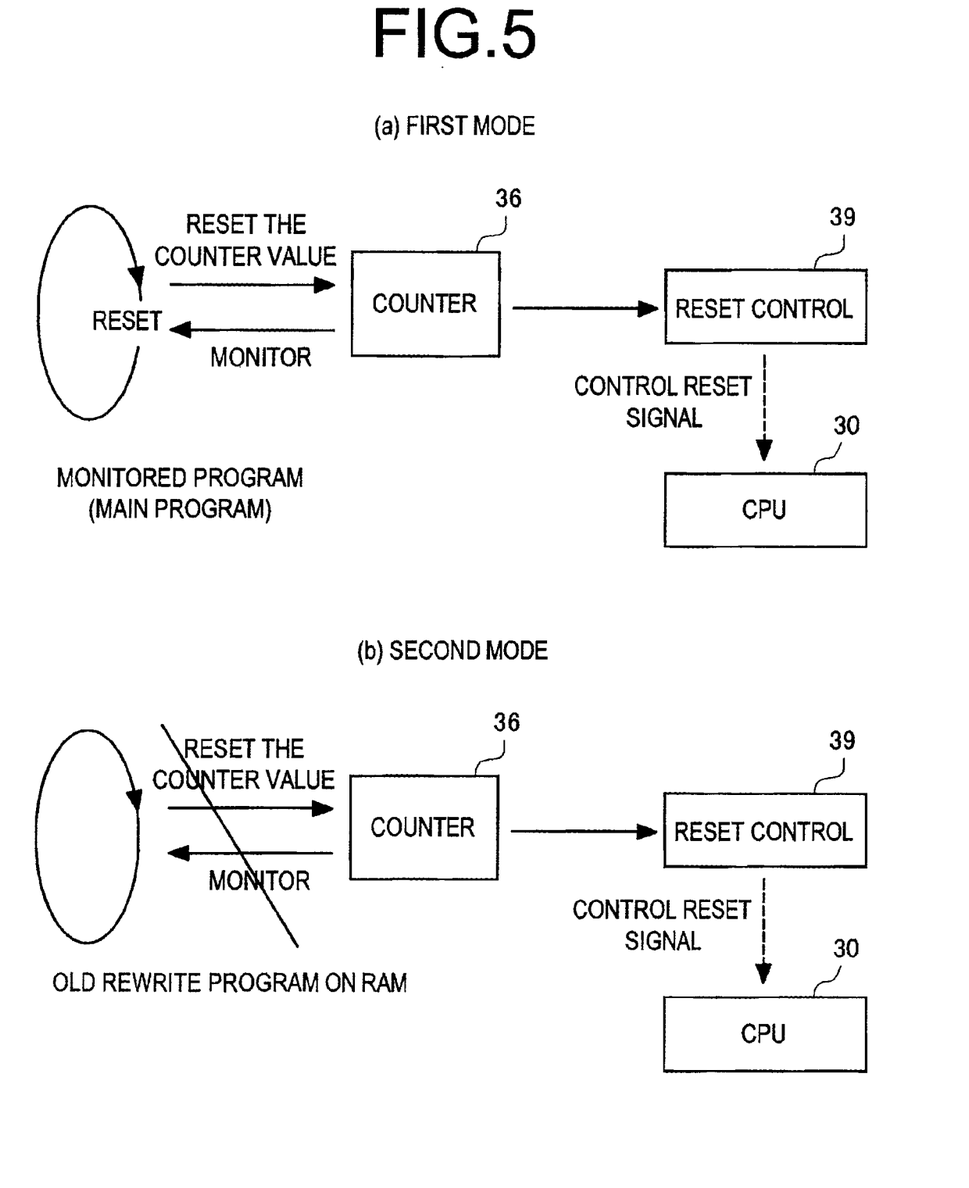
FIG. 5 contains schematic views of program monitoring operation.

As shown in FIG. 5(*a*) (first mode), a program (monitored program) monitored by the WDT circuit 35 is configured to reset the count value of the counter (CNT) 36 at predetermined intervals, and the above-mentioned overflow time T is set to be a time slightly longer than the reset interval of the counter value by the program. Accordingly, when the monitored program goes out of control and the counter value is not reset within the overflow time T, the counter 36 causes an overflow. In response to the overflow, the reset control 39 outputs a control reset signal, and the CPU 30 is reset.

In this Embodiment, as shown in FIG. 5(*a*), the main program Pm is configured to reset the counter 36 at predetermined intervals so as to be monitored by the WDT circuit 35. Accordingly, after the initial processing is executed according to the initial program Pn after powering on the apparatus, the main program Pm is executed, and during the execution of the main program Pm, the WDT circuit 35 operates in the first mode for monitoring the program as described above.

Figure 6:
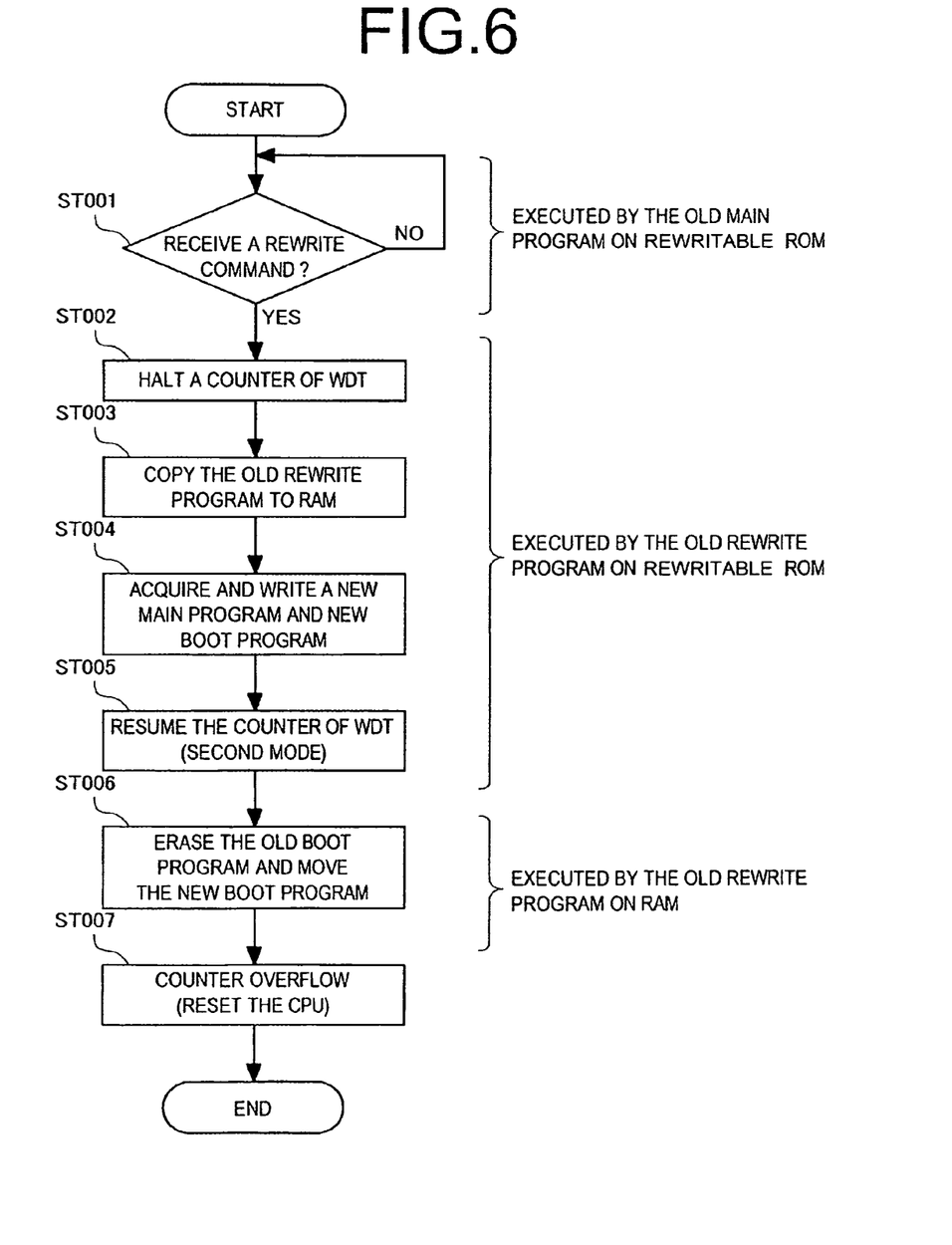
FIG. 6 shows a program rewrite flow.

The second mode of the WDT circuit 35 that is executed in rewriting the program will be described with reference to the flowchart of FIG. 6. In addition, in this Embodiment, descriptions are given assuming that both of the boot program Pb and main program Pm are rewritten as an example. When a user or service person selects rewrite of the program on a predetermined screen of the PC 20, the PC 20 transmits a rewrite command to the scanner 10, and the scanner 10 receives this command (ST001). The CPU 30 receiving the rewrite command shifts the program to execute to the rewrite program on the rewritable ROM 31 from the main program Pm, and performs the following processing.

The CPU 30 sets the ON/OFF setting area Ar1 of the counter register 37 at 0, and halts the count operation of the counter 36 of the WDT circuit 35 (ST002). By this means, the WDT circuit 35 is in a state of not monitoring any program. Then, in ST003, the rewrite program is copied to the RAM 32 (in addition, thereafter, the rewrite program and main program each before being rewritten are respectively referred to as an old rewrite program PkO and old main program PmO, and new rewrite program and main program are respectively referred to as a new rewrite program PkN and new main program PmN.)

Figure 7:
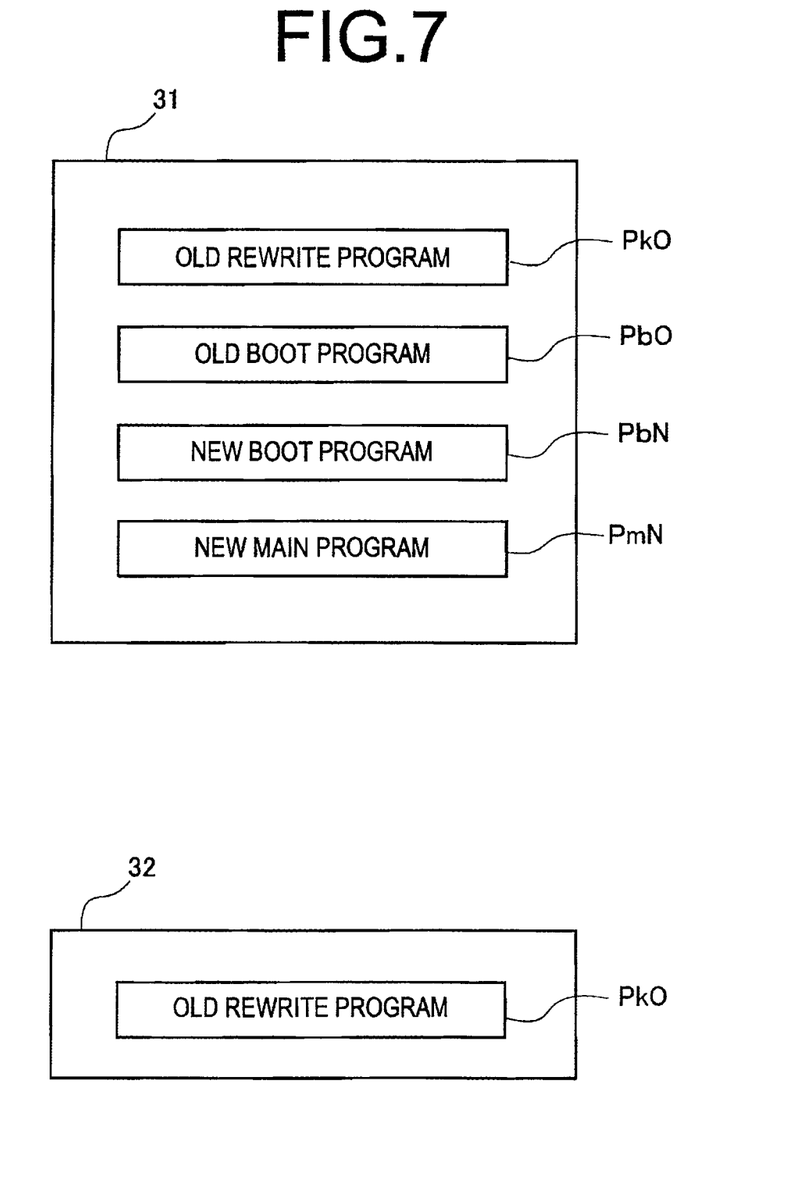
FIG. 7 is an explanatory view of program states of FIG. 6.

In ST004, the PC 30 acquires the new main program PmN and new boot program PbN from the PC 20 to write. More specifically, after erasing the old main program PmO stored on the rewritable ROM 31, the CPU 30 receives the new main program PmN and new boot program PbN transmitted from the PC 20. Then, the new main program PmN is written in the area where the old main program PmO has been stored, and the new boot program PbN is written in an area different from the area where the old boot program PbO is stored. This state is shown in FIG. 7.

Next, the CPU 30 sets the ON/OFF setting area Ar1 of the counter register 37 at 1, and resumes the count operation of the counter 36 (ST005). In addition, at this point, as described above, since the overflow time T is determined by the frequency of the clock input to the counter 36, the frequency of the clock is selected and set such that the time is sufficient for erasing of the old boot program and movement of the new boot program as described later.

ST006 is executed by the old rewrite program PkO on the RAM 32, the old boot program PbO on the rewritable ROM 31 is erased, while the new boot program PbN acquired in ST004 is written in the area where the old boot program PbO has been stored. In addition, the count operation of the counter 36 of the WDT circuit 35 is resumed in ST005, but runs in the second mode of not monitoring the program.

In other words, as shown in FIG. 5 (*b*), the old rewrite program PkO on the RAM 32 executed in ST006 is not configured to reset the count value at predetermined intervals, and does not undergo monitoring of the WDT circuit 35. Accordingly, the counter 36 is not reset by the old rewrite program PkO and causes an overflow, the reset control 39 outputs a control reset signal, and the CPU 30 is reset. In other words, after executing the new initial program PnN, the new main program PmN is executed.

Thus, the old rewrite program PkO on the RAM 32 is configured not to reset the count value of the counter regularly, the counter 36 is thereby caused to intentionally result in overflow, and the CPU 30 is thus automatically reset after rewriting the program. In other words, by using the WDT circuit 35 as a circuit to reset the CPU 30 (using in the second mode), it is made possible to reset the CPU 30 without using a dedicated circuit.

In addition, in this Embodiment, the counter 36 is resumed at timing between the ST004 and ST006, but is resumed at any timing such that the counter 36 causes an overflow after the end of processing of ST006.

Further, in this Embodiment, after receiving the rewrite command, the count operation of the counter 36 of the WDT circuit 35 is temporarily halted in ST002. Even when the old rewrite program PkO on the rewritable ROM 31 is also configured to reset the counter 36 at predetermined intervals as the main program, and is monitored by the WDT circuit 35 during the processing of ST003 and ST004, such a program arises that it takes time to acquire the new program from the PC 20 in ST004, the CPU 30 is reset due to the overflow, and that the new program is not acquired, and to avoid the problem, the count operation is temporarily halted.

Figure 8:
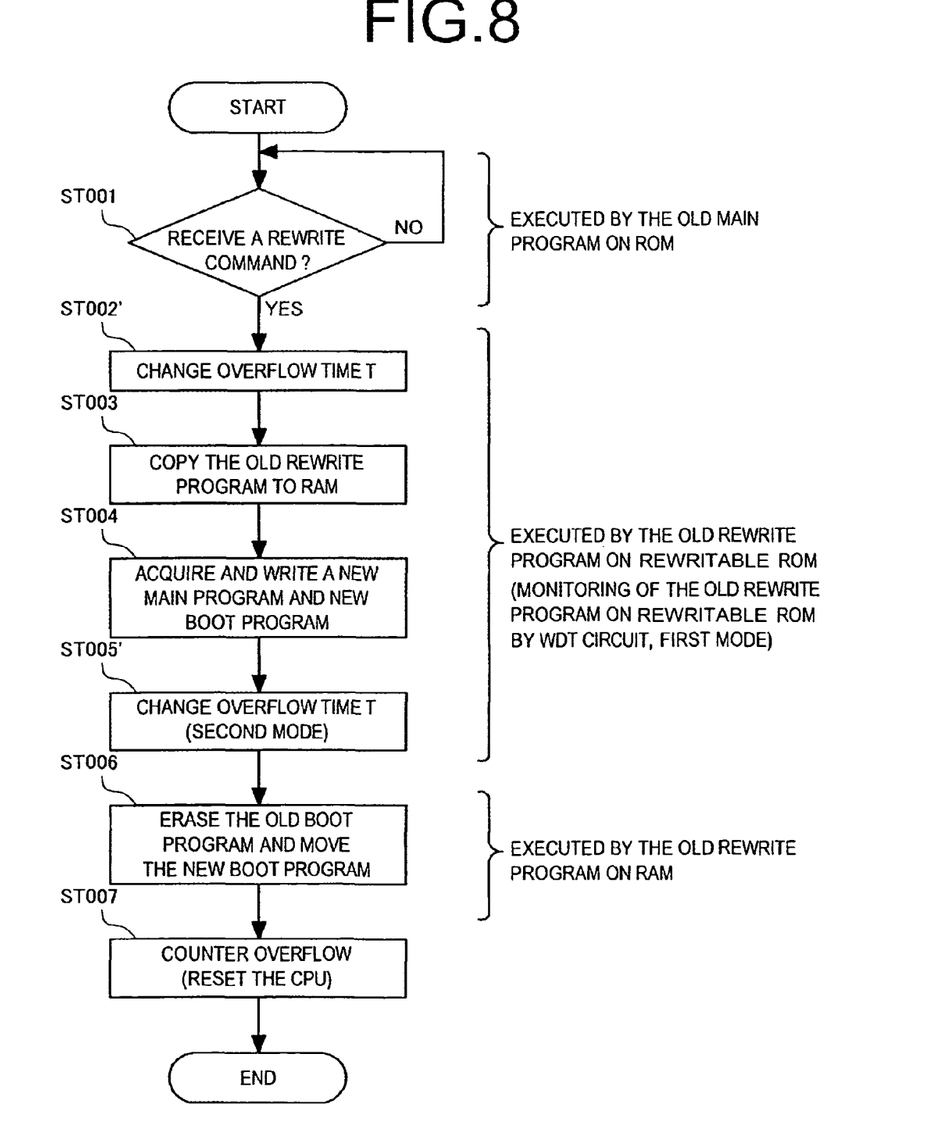
FIG. 8 shows another program rewrite flow different from in FIG. 6.

Referring to FIG. 8, described next is Embodiment 2 for avoiding such a problem and automatically performing reset of the CPU 30 after rewriting the program using the WDT circuit 35 as in Embodiment 1.

[Embodiment 2]

The count operation of the counter 36 is halted in Embodiment 1, and in Embodiment 2, the program is subjected to rewrite processing while maintaining the count operation. Only parts different from Embodiment 1 will be described below.

After receiving a rewrite command in ST001, the overflow time T of the counter 36 is changed in ST002'. The old rewrite program on the rewritable ROM 31 is beforehand configured to reset the counter 36 at predetermined intervals by dividing the processing of ST004 or the like, and the overflow time T is changed in ST002' in accordance with the reset period of the counter 36. By this means, the overflow does not occur during the processing of ST003 and ST004, and it is possible to acquire a new program.

Next, the overflow time T of the counter 36 is changed again in ST005'. As in Embodiment 1, the old rewrite program Pk0 on the RAM 32 executed in ST006 is not configured to reset a counter value at predetermined intervals as shown in FIG. 5(*b*), and is not monitored by the WDT circuit 35 even when the counter 36 operates. Accordingly, in ST005', the overflow time T of the counter 36 is set so as to cause an overflow after completing the processing of ST006.

Thus, in Embodiment 2, the WDT circuit 35 operates in the second mode after ST005'. As described above, as in Embodiment 2, by using the WDT circuit 35 as a circuit to reset the CPU 30 (using in the second mode), it is made possible to reset the CPU 30 without using a dedicated circuit.

In addition, this application claims priority from Japanese Patent Application No. 2009-028261 incorporated herein by reference.

What is claimed is:

1. An apparatus for monitoring a microprocessor, comprising:
    a microprocessor;
    storing means for storing a program that the microprocessor executes; and
    a watchdog timer circuit having timer means for timing and monitoring an operation of the program,
    wherein the watchdog timer circuit has a first mode for resetting the timer means at predetermined intervals by the program and resetting the microprocessor when the timer means is not reset for a predetermined time, and a second mode for resetting and restarting the microprocessor by not resetting the timer means for the predetermined time forcibly after a completion of execution of a rewriting program rewriting the program stored in the storing means.

2. The apparatus for monitoring a microprocessor according to claim 1, wherein the watchdog timer circuit actuates the timer means at a predetermined timing after halting an operation of the timer means when rewriting the program in the second mode.

3. The apparatus for monitoring a microprocessor according to claim 1, wherein after acquiring a new program from an upper apparatus, the watchdog timer circuit actuates the timer means in the second mode to start.

4. An apparatus for monitoring a microprocessor, comprising:
    a microprocessor;
    storing means for storing an initial program, a main program, and a rewriting program that the microprocessor executes; and
    a watchdog timer circuit having
        counter means for counting a clock signal generated and resetting a value counted with a timer reset signal generated from the microprocessor at a predetermined interval,
        reset control means for outputting a restart reset signal restarting the microprocessor to the microprocessor when the counter means reaches a predetermined number, and
        counter register means for starting and halting the counter means,
    wherein the watchdog timer circuit monitors operation of the rewriting program, outputs the restart reset signal from the reset control means by forcibly reaching the counter means to the predetermined number after the rewriting program stored in the storing means is executed and rewriting of the main program is completed, and restarts the microprocessor.

5. The apparatus for monitoring a microprocessor according to claim 4, wherein, when rewriting the main program, the counter register means halts the counter means, and starts counting of the counter means when the counter means reaches the predetermined number at least after the rewriting of the main program is completed.

6. The apparatus for monitoring a microprocessor according to claim 4, wherein the microprocessor executes a new main program which is rewritten with the restart reset signal output from the reset control means after the rewriting of the main program is completed.

* * * * *